(12) United States Patent
Gaertner et al.

(10) Patent No.: US 12,111,801 B2
(45) Date of Patent: Oct. 8, 2024

(54) DYNAMIC SELECTION OF AN AERONAUTICAL DATA PROVIDER

(71) Applicant: The Boeing Company, Chicago, IL (US)

(72) Inventors: Marco Gaertner, Sinntal-Sannerz (DE); Ralf Rene Cabos, Hainburg (DE)

(73) Assignee: The Boeing Company, Arlington, VA (US)

( * ) Notice: Subject to any disclaimer, the term of this patent is extended or adjusted under 35 U.S.C. 154(b) by 162 days.

(21) Appl. No.: 17/680,731

(22) Filed: Feb. 25, 2022

(65) Prior Publication Data
US 2023/0273906 A1    Aug. 31, 2023

(51) Int. Cl.
*G06F 16/00* (2019.01)
*G06F 16/215* (2019.01)
*G06N 20/00* (2019.01)

(52) U.S. Cl.
CPC .......... *G06F 16/215* (2019.01); *G06N 20/00* (2019.01)

(58) Field of Classification Search
CPC .............................. G06F 16/215; G06N 20/00
See application file for complete search history.

(56) References Cited

U.S. PATENT DOCUMENTS

| | | | | |
|---|---|---|---|---|
| 2011/0054718 | A1* | 3/2011 | Bailey | G08G 5/0021 701/3 |
| 2016/0137289 | A1* | 5/2016 | Violette | G05D 1/102 701/14 |
| 2017/0148329 | A1* | 5/2017 | Cornell | G08G 5/0021 |
| 2018/0307729 | A1* | 10/2018 | Averbuch | G06F 16/29 |
| 2020/0355845 | A1* | 11/2020 | Mecikalski | G01W 1/10 |

OTHER PUBLICATIONS

Buis, Alan, The Raw Truth on Global Temperature Records, Ask NASA Climate, Mar. 25, 2021, retrieved on Aug. 25, 2023, retrieved from the internet <URL: https://climate.nasa.gov/explore/ask-nasa-climate/3071/the-raw-truth-on-global-temperature-records/> (Year: 2021).*

* cited by examiner

*Primary Examiner* — Tyler J Torgrimson
(74) *Attorney, Agent, or Firm* — Kunzler Bean & Adamson (57) ABSTRACT

Apparatuses, methods, systems, and program products are disclosed for dynamic selection of an aeronautical data provider. An apparatus includes a processor and a memory that stores code executable by the processor to receive streams of aeronautical data from a plurality of aeronautical data providers streaming aeronautical data from different geographic locations, determine a quality of each of the received streams of aeronautical data by checking the aeronautical data against data provided by at least one secondary data source that has a known quality, select an aeronautical data provider of the plurality of aeronautical data providers that provides a stream of aeronautical data that is closest to the data provided by the at least one secondary data source, and expose aeronautical data from the stream of aeronautical data of the selected aeronautical data provider to an end user according to one or more parameters.

20 Claims, 6 Drawing Sheets

DYNAMIC SELECTION OF AN AERONAUTICAL DATA PROVIDER

FIELD

This invention relates to flight management and more particularly relates to dynamic selection of an aeronautical data provider.

BACKGROUND

Different aeronautical data providers provide coverage of respective regions. However, data quality or accuracy varies by location for each data provider. As such, it is of interest to determine where one provider's data is more accurate than the other. In essence, determining a boundary where the data of one provider should be used instead of another data provider that can be referenced for future applications.

SUMMARY

The subject matter of the present application provides examples of dynamic selection of an aeronautical data provider that overcome the above-discussed shortcomings of prior art techniques. The subject matter of the present application has been developed in response to the present state of the art, and in particular, in response to shortcomings of conventional systems.

Disclosed herein is an apparatus for dynamic selection of an aeronautical data provider. The apparatus includes a processor and a memory that stores code executable by the processor to receive streams of aeronautical data from a plurality of aeronautical data providers streaming aeronautical data from different geographic locations, determine a quality of each of the received streams of aeronautical data by checking the aeronautical data against data provided by at least one secondary data source that has a known quality, select an aeronautical data provider of the plurality of aeronautical data providers that provides a stream of aeronautical data that is closest to the data provided by the at least one secondary data source, and expose aeronautical data from the stream of aeronautical data of the selected aeronautical data provider to an end user according to one or more parameters. The preceding subject matter of this paragraph characterizes example 1 of the present disclosure.

The code is executable by the processor to normalize data of each of the streams of aeronautical data from the plurality of aeronautical data providers. The preceding subject matter of this paragraph characterizes example 2 of the present disclosure, wherein example 2 also includes the subject matter according to example 1, above.

The code is executable by the processor to group the aeronautical data that are normalized from each of the streams of aeronautical data by data attributes. The preceding subject matter of this paragraph characterizes example 3 of the present disclosure, wherein example 3 also includes the subject matter according to example 2, above.

The data attributes are selected from the group comprising latitude, longitude, heading, altitude, speed, time of day, date, and geographic location. The preceding subject matter of this paragraph characterizes example 4 of the present disclosure, wherein example 4 also includes the subject matter according to example 3, above.

The quality of each of the received streams of aeronautical data is determined by calculating a proximity of data points of each of the received streams of aeronautical data to corresponding data points of the at least one secondary data source. The preceding subject matter of this paragraph characterizes example 5 of the present disclosure, wherein example 5 also includes the subject matter according to any of examples 1-4, above.

The at least one secondary data source is selected from a plurality of secondary data sources according to the known quality of each of the plurality of secondary data sources. The preceding subject matter of this paragraph characterizes example 6 of the present disclosure, wherein example 6 also includes the subject matter according to any of examples 1-5, above.

The code is executable by the processor to train a machine learning model along the one or more parameters using the stream of aeronautical data from the selected aeronautical data provider, the machine learning model used to predict which of the plurality of aeronautical data providers to select based on the one or more parameters along a boundary where the streams of aeronautical data overlap. The preceding subject matter of this paragraph characterizes example 7 of the present disclosure, wherein example 7 also includes the subject matter according to any of examples 1-6, above.

The one or more parameters is selected from the group comprising a latitude, a longitude, a heading, an altitude, a speed, a time of day, a date, and a geographic location. The preceding subject matter of this paragraph characterizes example 8 of the present disclosure, wherein example 8 also includes the subject matter according to any of examples 1-7, above.

The code is executable by the processor to determine a quality of the received streams of aeronautical data on a per-attribute basis and expose the aeronautical data on the per-attribute basis from multiple streams of the plurality of aeronautical data providers according to the determined quality. The preceding subject matter of this paragraph characterizes example 9 of the present disclosure, wherein example 9 also includes the subject matter according to any of examples 1-8, above.

The plurality of aeronautical data providers comprises data repositories that provide streams of aeronautical data for a plurality of flights, the received streams comprising streams of overlapping aeronautical data from different data repositories. The preceding subject matter of this paragraph characterizes example 10 of the present disclosure, wherein example 10 also includes the subject matter according to any of examples 1-9, above.

Further disclosed herein is a method for dynamic selection of an aeronautical data provider. The method includes receiving streams of aeronautical data from a plurality of aeronautical data providers streaming aeronautical data from different geographic locations, determining a quality of each of the received streams of aeronautical data by checking the aeronautical data against data provided by at least one secondary data source that has a known quality, selecting an aeronautical data provider of the plurality of aeronautical data providers that provides a stream of aeronautical data that is closest to the data provided by the at least one secondary data source, and exposing aeronautical data from the stream of aeronautical data of the selected aeronautical data provider to an end user according to one or more parameters. The preceding subject matter of this paragraph characterizes example 11 of the present disclosure.

The method further includes normalizing data of each of the streams of aeronautical data from the plurality of aeronautical data providers and grouping the aeronautical data that are normalized from each of the streams of aeronautical data by data attributes. The preceding subject matter of this paragraph characterizes example 12 of the present disclosure, wherein example 12 also includes the subject matter according to example 11, above.

The data attributes are selected from the group comprising latitude, longitude, heading, altitude, speed, time of day, date, and geographic location. The preceding subject matter of this paragraph characterizes example 13 of the present disclosure, wherein example 13 also includes the subject matter according to example 12, above.

The quality of each of the received streams of aeronautical data is determined by calculating a proximity of data points of each of the received streams of aeronautical data to corresponding data points of the at least one secondary data source. The preceding subject matter of this paragraph characterizes example 14 of the present disclosure, wherein example 14 also includes the subject matter according to any of examples 11-13, above.

The at least one secondary data source is selected from a plurality of secondary data sources according to the known quality of each of the plurality of secondary data sources. The preceding subject matter of this paragraph characterizes example 15 of the present disclosure, wherein example 15 also includes the subject matter according to any of examples 11-15, above.

The method further includes training a machine learning model along the one or more parameters using the stream of aeronautical data from the selected aeronautical data provider, the machine learning model used to predict which of the plurality of aeronautical data providers to select based on the one or more parameters. The preceding subject matter of this paragraph characterizes example 16 of the present disclosure, wherein example 16 also includes the subject matter according to any of examples 11-15, above.

The one or more parameters is selected from the group comprising a latitude, a longitude, a heading, an altitude, a speed, a time of day, a date, and a geographic location. The preceding subject matter of this paragraph characterizes example 17 of the present disclosure, wherein example 17 also includes the subject matter according to any of examples 11-16, above.

The method further includes determining a quality of the received streams of aeronautical data on a per-attribute basis and expose the aeronautical data on the per-attribute basis from multiple streams of the plurality of aeronautical data providers according to the determined quality. The preceding subject matter of this paragraph characterizes example 18 of the present disclosure, wherein example 18 also includes the subject matter according to any of examples 11-17, above.

The plurality of aeronautical data providers comprises data repositories that provide streams of aeronautical data for a plurality of flights, the received streams comprising streams of overlapping aeronautical data from different data repositories. The preceding subject matter of this paragraph characterizes example 19 of the present disclosure, wherein example 19 also includes the subject matter according to any of examples 11-18, above.

Further disclosed herein is a system for dynamic selection of an aeronautical data provider that includes a plurality of data repositories each streaming aeronautical data from different geographic locations. The system includes an on-board flight controller comprising a processor and a memory that stores code executable by the processor to receive streams of aeronautical data from the plurality of data repositories, determine a quality of each of the received streams of aeronautical data by checking the aeronautical data against data provided by at least one secondary data source that has a known quality, select a data repository of the plurality of data repositories that provides a stream of aeronautical data that is closest to the data provided by the at least one secondary data source, and expose aeronautical data from the stream of aeronautical data of the selected data repository to an end user according to one or more parameters. The preceding subject matter of this paragraph characterizes example 20 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Figure 1:
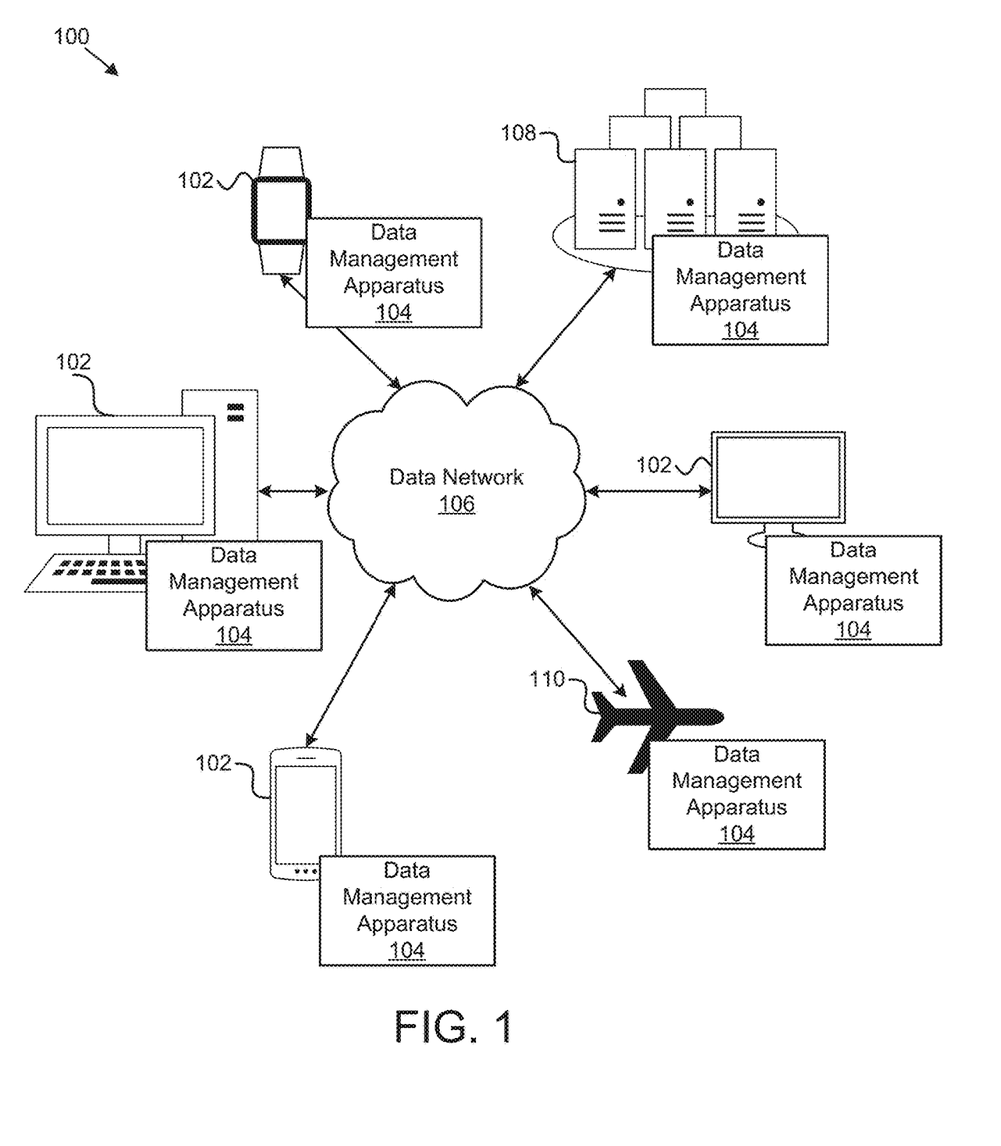
FIG. 1 is a schematic block diagram illustrating one embodiment of a system for dynamic selection of an aeronautical data provider.

FIG. 1 is a schematic block diagram illustrating one embodiment of a general information system 100 for dynamic selection of an aeronautical data provider. In one embodiment, the system 100 includes one or more information handling devices 102, one or more data management apparatuses 104, one or more data networks 106, one or more servers 108, and one or more aircraft 110. In certain embodiments, even though a specific number of information handling devices 102, data management apparatuses 104, data networks 106, and servers 108 are depicted in FIG. 1, one of skill in the art will recognize, in light of this disclosure, that any number of information handling devices 102, data management apparatuses 104, data networks 106, servers 108, and aircraft 110 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the data management apparatus 104 is configured to receive streams of real-time aeronautical data from different aeronautical data providers located at different geographic locations, determine a quality of each of the received streams of aeronautical data based on data received from various secondary sources, select the stream of aeronautical data that is closest to the secondary sources, and expose the selected stream of aeronautical data to an end user according to various parameters. The data management apparatus 104 is described in more detail below with reference to FIGS. 2 and 3.

In one embodiment, the data management apparatus 104 is part of a flight management system that may be located on board an aircraft 110, on a ground control system, and/or some combination of both. In certain embodiments, the data management apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the data management apparatus 104 may include a power interface, a wired and/or wireless network interface, a graphical interface that attaches to a display, and/or a semiconductor integrated circuit device as described below, configured to perform the functions described herein regarding the data management apparatus 104.

The data management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the data management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the data management apparatus 104.

The semiconductor integrated circuit device or other hardware appliance of the data management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the data management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to store content and to execute or run video/audio conferencing and/or other online presentation algorithms, programs, applications, processes, and/or the like. The one or more servers 108 may be part of a flight management system maintained by an aviation agency, e.g., the federal aviation administration, an airline, an airport, and/or the like.

The aircraft 110, in one embodiment, may include civil and military aircraft such as a private airplane, a commercial airplane, a cargo airplane, a jet, a helicopter, a drone, and/or the like. One of skill in the art, in light of this disclosure, will recognize the various types of aircraft that may be used with the solutions proposed herein.

Figure 2:
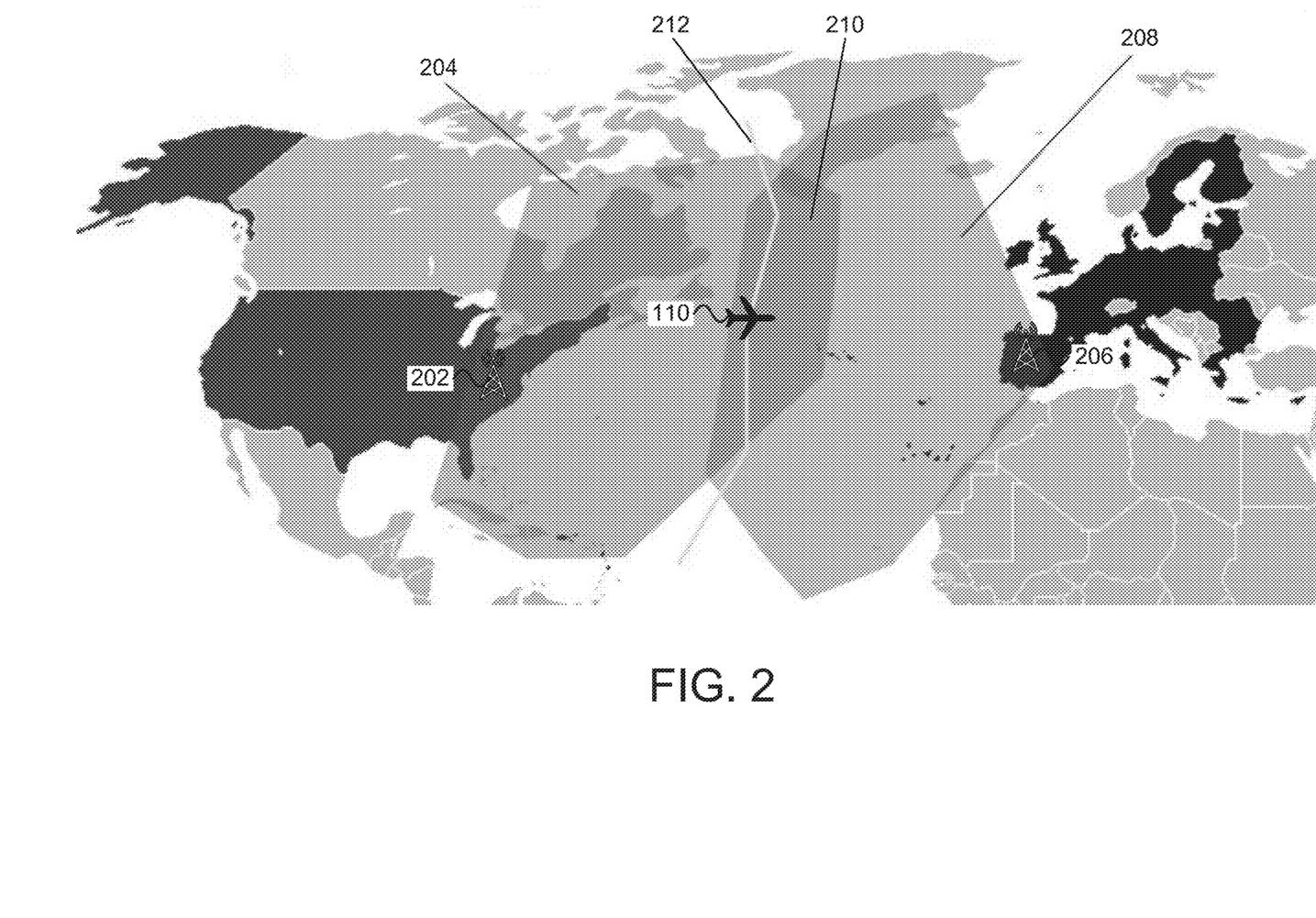
FIG. 2 depicts one example embodiment of a scenario for dynamic selection of an aeronautical data provider.

FIG. 2 depicts one example embodiment of a scenario that the subject matter herein proposes solutions for. In one embodiment, a first ground-based station 202 (data repository) provides streaming, real-time aeronautical data to an aircraft 110 within a first predefined area 204. Similarly, a second ground-based station 206 (data repository) may stream real-time aeronautical data to an aircraft 110 within a second predefined area 208. There may be numerous ground-based stations 202, 206 (data repositories) located at various geographic locations. In one embodiment, the ground-based stations 202, 206 (data repositories) are owned, managed, maintained, or otherwise operated by an airline (e.g., Delta® airlines), an aircraft manufacturer (e.g., Boeing®), a government agency (e.g., the federal aviation administration's ("FAA") system wide information management ("SWIM"), Eurocontrol's network manager, or the like), and/or the like.

In one embodiment, the aeronautical data includes system-wide flight information that may have various formats, such as aeronautical information exchange model ("AIXM"), flight information exchange model ("FIXM"), weather information exchange model ("WXXM"). In one embodiment, the aeronautical data may include information that is useful for an aircraft 110, e.g., a flight control system, a pilot, or the like, during a flight. For example, the ground-based stations 202, 206 (data repositories) may stream aeronautical data that includes surveillance data, actual or predicted times (e.g., time of arrival, time of departure, off-block time, taxi time, sector's crossing times, or the like), airspace configuration data, airspace congestion levels, routes availability, and/or the like.

In one embodiment, when sharing aeronautical information, the different data providers (e.g., ground control stations 202, 206) offer data in their own structure, where the quality of the information and the geographical distribution varies from one to another. For instance, the concept of SWIM refers to a set of standards for infrastructure and governing protocols that allow Air Traffic Management ("ATM") providers and users to exchange ATM-related information. However, a SWIM environment only establishes a procedure to share information; it may not impose any requirement on the information quality. Subsequently, each provider offers different varieties of information with different levels of quality. The differences may be even more stark when it comes to predictions of certain events in the management of a flight since each provider might have its own methodology to generate the data. Another example can be found in automatic dependent surveillance-broadcast ("ADS-B") surveillance tracking providers, where the availability of information in a specific geographic area is determined by the number of receivers deployed.

In addition, these providers often provide model-based predictions that can vary substantially from one to another. Considering that most aeronautical information providers do not offer coverage for the entire airspace on Earth, the differences in the type and quality of information between different providers makes it difficult to integrate this information seamlessly into devices and applications.

As shown in FIG. 2, the broadcast or streaming areas 204, 208 of the different ground-based stations 202, 206 (data repositories), e.g., an FAA-managed station and a Eurocontrol-managed station, may overlap, creating an overlap area 210, where the aircraft 110 can receive streaming aeronautical data from both (or more) ground stations 202, 206 (data repositories) regardless of the aircraft's 110 actual position, time, heading, altitude, phase of flight, and/or the like for each distinct flight and flight route. In such an embodiment, aeronautical data received from a first ground station 202 (data repository) may be more accurate that aeronautical data received from a second ground station 206 (data repository). Accordingly, the subject matter herein describes solutions for determining a boundary, line, and/or other area 212 where a switch can be made from receiving and using aeronautical data from a first ground station 202, 206 (data repository) to receiving and using aeronautical data from a second ground station 206, 202 (data repository) during a flight.

In general, the subject matter disclosed herein enables the determination and provision of globally available system wide flight information. The apparatus normalizes flight information as defined by AIXM, FIXM, WXXM, and/or the like provided by various data originators such as e.g., FAA's SWIM or Eurocontrol's Network Manager, and provides a single data point derived from the best and most accurate data source dependent of various flight identifiers and data attributes such as actual position, time, heading, altitude, phase of flight, and/or the like for each distinct flight route. The invention is constantly improving the accuracy model using historic flight information and real-time SWIM data to improve the confidence level of the data points.

Figure 3:
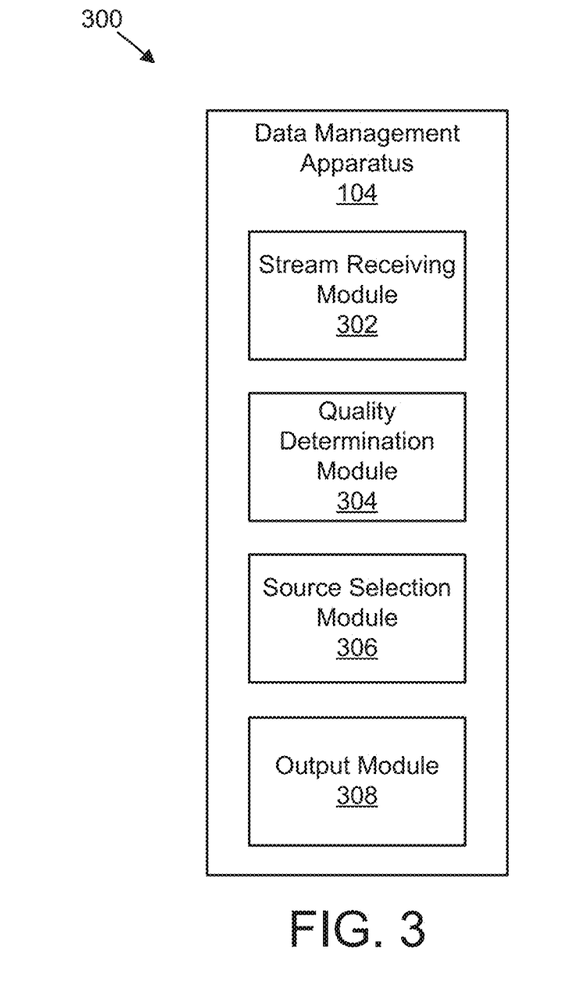
FIG. 3 depicts one embodiment of an apparatus for dynamic selection of an aeronautical data provider.

FIG. 3 depicts one embodiment of an apparatus 300 for dynamic selection of an aeronautical data provider. In one embodiment, the apparatus 300 includes an instance of a data management apparatus 104. The data management apparatus 104 may include embodiments of a stream receiving module 302, a quality determination module 304, a source selection module 306, and an output module 308, which are described in more detail below.

In one embodiment, the stream receiving module 302 is configured to receive streams of real-time aeronautical data from a plurality of aeronautical data providers streaming aeronautical data from different geographic locations. For instance, the stream receiving module 302 may be registered for, subscribed to, or otherwise authorized to receive the streaming aeronautical data, which may be received over a data network 106 such as over a cellular data network, a non-terrestrial (satellite) data network, and/or the like. In one embodiment, the stream receiving module 302 listens, polls, or otherwise detects when a stream of aeronautical data is available from a data provider (e.g., a ground-based station, data repository, or the like), and performs an authorization procedure with the data provider to receive the streaming aeronautical data.

For example, a stream receiving module 302 on a flight leaving the United States for Europe may be authorized and may receive real-time streaming aeronautical data, e.g., SWIM data, from a ground-based station/data repository operated by the FAA. As the flight gets closer to Europe, the stream receiving module 302 may detect streaming aeronautical data, e.g., SWIM data being broadcast from a ground-based station/data repository in Europe that is operated by Eurocontrol. In such an embodiment, the stream receiving module 302 authenticates with the Eurocontrol system and starts receiving the streaming aeronautical data from the Eurocontrol data provider. Similarly, other streaming data may also be received, if available, such that the stream receiving module 302 receives streaming aeronautical data from a plurality of data providers.

In one embodiment, the quality determination module 304 is configured to determine a quality of each of the received streams of aeronautical data by checking the aeronautical data against data provided by at least one secondary data source that has a known quality. As used herein, the quality may refer to a resolution, an integrity, e.g., an assurance level, a timeliness, an accuracy, a completeness, a traceability, a format, and/or the like.

In certain embodiments, the secondary data sources may include data sources that provide surveillance data including multilateration data, radar data, internal reference system data, and/or the like. For example, the stream receiving module 302 may receive streaming aeronautical data from different sources, which is then compared against the data received from the secondary sources to determine a quality of the streaming data, e.g., whether the streaming data is accurate within a threshold margin, whether the streaming data has an error that satisfies a threshold error or a confidence that satisfies a threshold confidence level, and/or the like.

In one embodiment, the at least one secondary data source is selected from a plurality of secondary data sources according to the known accuracy quality of each of the plurality of secondary data sources, e.g., a level of "truth." For instance, the quality determination module 304 may receive or have a listing of available secondary data sources that are related to, e.g., provide similar data to, the streaming aeronautical data that is received. The listing may be ranked by availability, known accuracy, error probability, and/or the like. For example, if the streaming aeronautical data comprises radar data, the quality determination module 304 may check, receive, or otherwise determine a list of secondary data sources that provide similar radar data, ranked by a known or probable accuracy, confidence, or error for determining a quality of the streaming aeronautical data in relation to the data provided by the secondary source(s).

In one embodiment, the quality determination module 304 determines the quality of each of the received streams of aeronautical data by calculating a proximity of data points of each of the received streams of aeronautical data to corresponding data points of the at least one secondary data source. For example, the quality determination module 304 may use a statistical analysis, a machine learning model, and/or the like (e.g., a random forest, regression, artificial neural network, and/or the like) to determine how close the streamed aeronautical data is to the corresponding data points of the secondary data sources along three, four, five, or more dimensions (e.g., geographic location, time, weather, heading, speed, altitude, and/or the like).

For instance, the quality determination module 304, in one embodiment, inputs the received aeronautical data and data from the secondary data sources into a decision model (described below), which analyzes both sets of data to determine a quality of the streamed aeronautical data. The quality may include a value such as a score, ranking, rating, estimation, prediction, forecast, and/or the like that is used to describe a quality of the streaming aeronautical data, e.g., an accuracy, a confidence, a likelihood, a probability, and/or the like that is used to determine or calculate a proximity of the streaming aeronautical data to the data provided by the secondary data sources.

In one embodiment, the quality determination module 304 may determine a quality of a stream of aeronautical data along a plurality of dimensions. For example, a first stream of aeronautical data may have a higher quality along a latitude and a longitude than a second stream of aeronautical data; however, the second stream of aeronautical data may have a higher quality along a heading and an altitude than the first stream of aeronautical data. Thus, the quality determination module 304 determines the quality of the streams of aeronautical data along one or more dimensions, variables, parameters, indicators, and/or the like.

In one embodiment, the source selection module 306 is configured to select an aeronautical data provider of the plurality of aeronautical data providers that provides a stream of aeronautical data that is closest to the data provided by the at least one secondary data source. "Closest" may be used in the sense that it has a higher quality based on the metrics or values that the quality determination module 304 determines, such as an accuracy, confidence, likelihood, probability, error, and/or the like.

In such an embodiment, the source selection module 306 switches, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data.

For instance, if the quality determination module 304 determines that aeronautical data from a second data provider, e.g., SWIM data from an FAA-operated data provider, is "closer" to the data that the secondary data providers provide than a first data provider, e.g., SWIM data from a Eurocontrol-operated data provider, during a flight, then the source selection module 306 may switch to using data from the second data provider, e.g., the FAA-operated data provider, instead of the first data provider, e.g., the Eurocontrol-operated data provider.

In one embodiment, the output module 308 is configured to expose aeronautical data from the stream of aeronautical data of the selected aeronautical data provider to an end user according to one or more parameters. The end user, for example, may be a flight control system, e.g., an on-board flight control system, a ground-based flight control system, a data repository, and/or the like. The output module 308 may expose the aeronautical data from the selected aeronautical data provider using an interface such as an application programming interface ("API"), a user interface, and/or the like.

Figure 4:
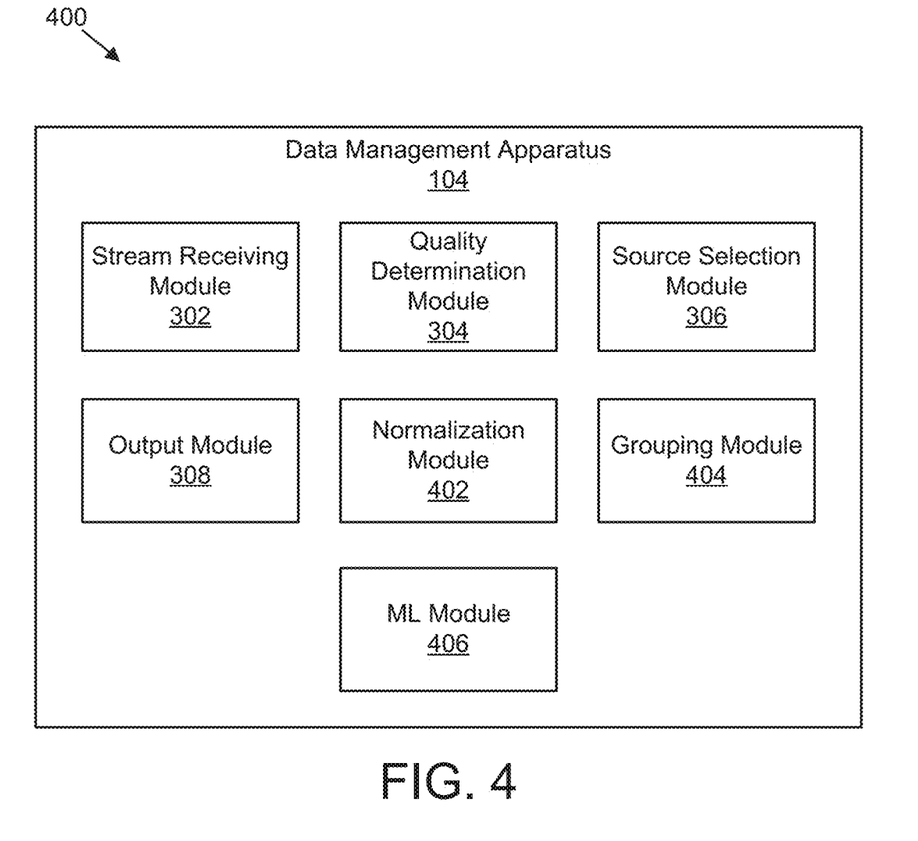
FIG. 4 depicts one embodiment of another apparatus for dynamic selection of an aeronautical data provider.

FIG. 4 depicts one embodiment of an apparatus 400 for dynamic selection of an aeronautical data provider. In one embodiment, the apparatus 400 includes an instance of a data management apparatus 104. The data management apparatus 104 may include embodiments of a stream receiving module 302, a quality determination module 304, a source selection module 306, and an output module 308, which may be substantially similar to the stream receiving module 302, the quality determination module 304, the source selection module 306, and the output module 308 described above with reference to FIG. 3. Furthermore, the data management apparatus 104 may include embodiments of a normalization module 402, a grouping module 404, and an ML module 406, which are described in more detail below.

In one embodiment, the normalization module 402 is configured to normalize each of the streams of aeronautical data that is received from the plurality of aeronautical data providers and/or the data from the secondary data providers prior to using it, e.g., providing it to a decision model. Normalization may refer to modifying, adjusting, organizing, or the like data from different sources to appear similar across records, fields, values, and/or the like, so that the data may be treated the same.

For instance, each data provider may provide streaming aeronautical data in different formats, structures, and/or the like. To process the data, e.g., using the decision model, the normalization module 402 may convert each data value, record, field, or the like to a standard form, format, structure, or the like so that aeronautical data from different data providers can be treated or analyzed in the same manner.

In one embodiment, the grouping module 404 is configured to group the normalized aeronautical data from each of the stream of aeronautical data by different data attributes. In one embodiment, the data attributes describe different flight identifiers that verify a unique flight object. For example, the data attributes may include a latitude, a longitude, a heading, an altitude, a speed, a time of day, a date, and a geographic location. Thus, the grouping module 404 segments and groups normalized streaming aeronautical data from different sources based on different flight attributes, which can then be used to determine a quality of the streaming aeronautical data relative to corresponding data from secondary data sources.

In one embodiment, the ML module 406 is configured to generate a decision model based on streaming aeronautical data. As described above, the decision model is a machine learning model that is generated based on one or more machine learning algorithms, such as supervised learning algorithms (e.g., nearest neighbor, naïve bayes, decision trees, linear regression, support vector machines, neural networks, and/or the like), unsupervised learning algorithms (e.g., k-means clustering, association rules, and/or the like), semi-supervised learning algorithms, reinforcement learning algorithms (e.g., q-learning, temporal difference, deep adversarial networks, and/or the like), and/or the like. Machine learning, as used herein, refers to methods of data analysis that automates analytical model building. It is a branch of artificial intelligence based on the idea that systems can learn from data, identify patterns, and make decisions with minimal human intervention.

Thus, in one embodiment, the generated decision model comprises a machine learning model that is trained on the historical aeronautical data. Training the machine learning model may refer to providing an ML algorithm (that is, the learning algorithm) with training data to learn from. The term ML model may refer to the model artifact that is created by the training process. In one embodiment, the training data contains the correct answer, which is known as a target or target attribute. The learning algorithm finds patterns in the training data that map the input data attributes to the target (the answer that you want to predict), and it outputs an ML model that captures these patterns. The ML model may be used to get predictions on new data for which the target is not known, such as, an accuracy of a set of aeronautical data at a particular geographic location, altitude, heading, and/or the like.

In some embodiments, the ML module 406 trains the decision model on historical streaming aeronautical data that is received along a particular flight path from different data providers. The ML module 406 may further train and refine the decision model using new streaming data as it is received. In this manner, the ML module 406 constantly refines the decision model during and/or after a flight so that the decision model is up to date to provide predictions, estimations, forecasts, and/or the like regarding which stream of aeronautical data has the highest or best quality (e.g., accuracy) at any given point in time, which the output module 308 exposes to an end user, e.g., via an API.

Figure 5:
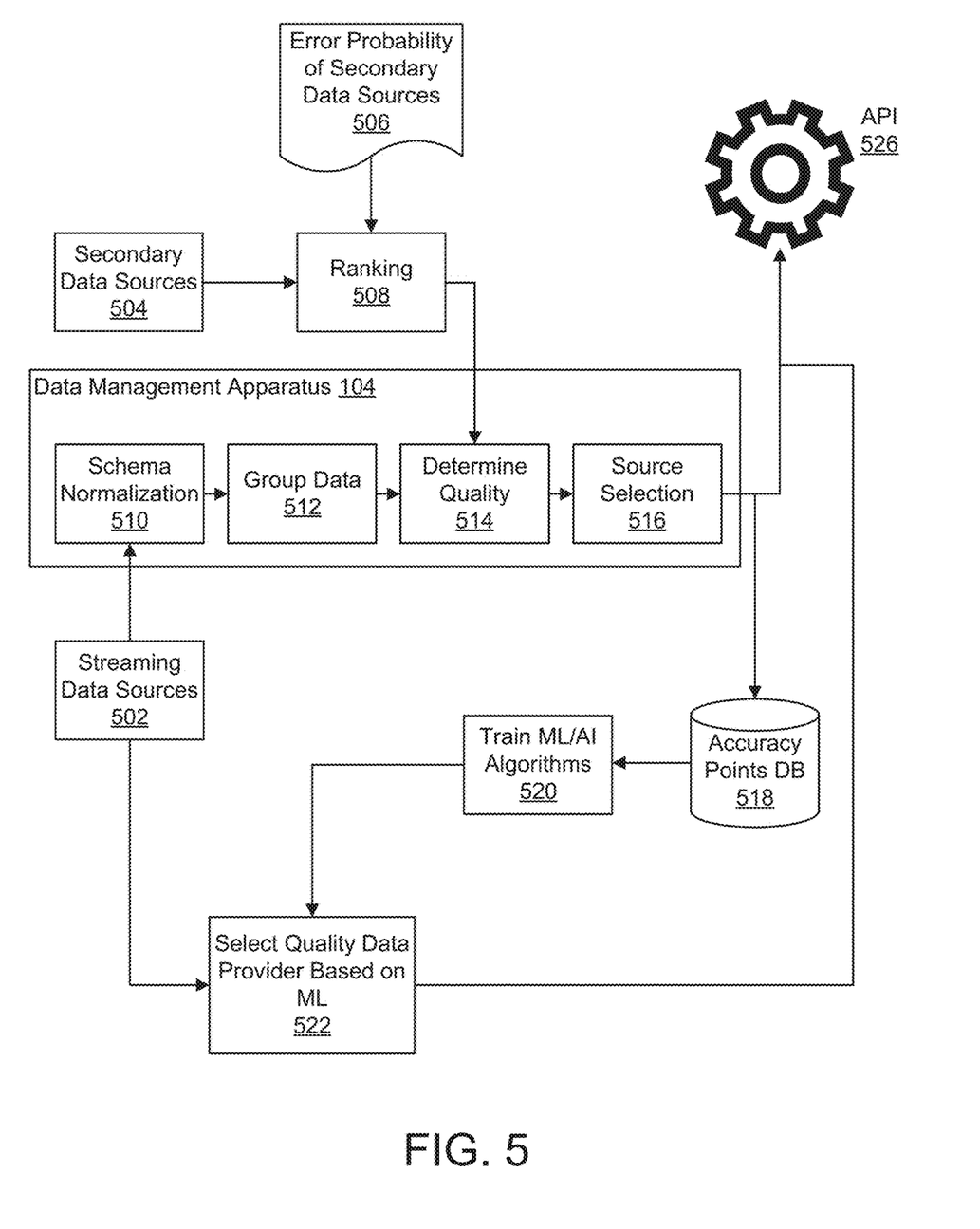
FIG. 5 depicts one embodiment of a system flow for dynamic selection of an aeronautical data provider.

FIG. 5 depicts one embodiment of a system flow 500 for dynamic selection of an aeronautical data provider. In one embodiment, a plurality of streaming data sources 502, e.g., ground-based data providers or data repositories, provide real-time, streaming aeronautical data for a flight. In one embodiment, one or more secondary data sources 504 provide aeronautical data that has a known quality or accuracy such as radar data, MLAT data, ADS-B data, aeronautical information *circulars*, IRS data, and/or the like.

A nominal error probability 506 for each secondary data source is determined and the secondary data sources are then ranked 508 according to the nominal error probability, availability, and/or the like. In one embodiment, the aeronautical data from the streaming data sources 502 and the data from the secondary data sources (ranked) are provided to a data management apparatus 104.

In one embodiment, the streaming aeronautical data is normalized 510, e.g., by the normalization module 402, and grouped according to various data attributes/flight identifiers, e.g., by the grouping module 404. The quality of the streaming aeronautical data is determined 514, based on determining which of the streams of aeronautical data is closest or most proximate to corresponding data provided by the secondary data sources. The "closest" aeronautical data stream to the "truth," e.g., to the data that the secondary data sources provide, is selected and exposed to an end-user, e.g., via an API 526 via the source selection module 306 and the output module 308.

In one embodiment, the aeronautical data from the selected aeronautical data stream is stored in a database 518 and may be used to train machine learning/artificial intelligence models/algorithms 520, e.g., by the ML module 406. Accordingly, the trained ML model may be used 522 for future flights, for reference, and/or the like, to predict a streaming aeronautical data provider to select in response to detecting a plurality of streams of aeronautical data during a flight. The streaming aeronautical data from each data provider may be provided as input to the ML model and used to select 522 the data provider that provides the highest quality aeronautical data along one or more dimensions, variables, parameters, or the like, which is then exposed to an end-user via an API 526.

Figure 6:
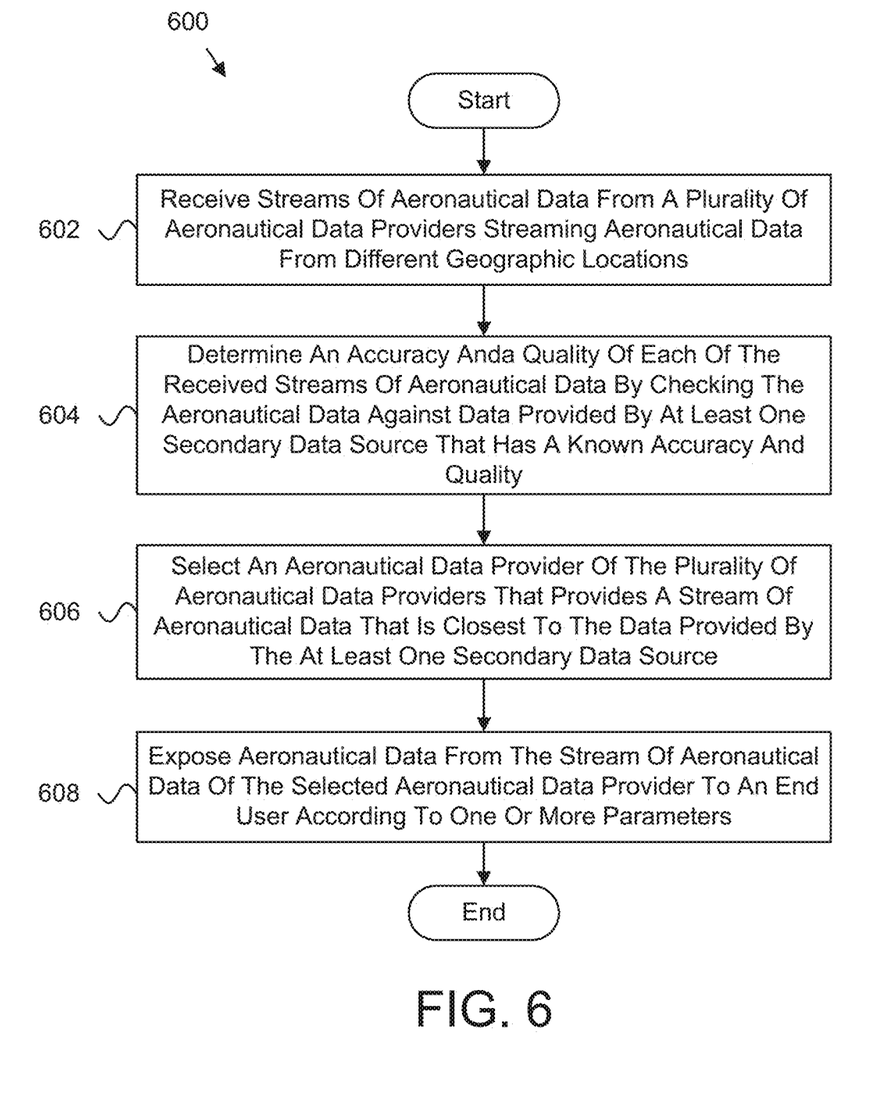
FIG. 6 is a schematic block diagram illustrating one embodiment of a method for dynamic selection of an aeronautical data provider.

FIG. 6 depicts one embodiment of a method 600 for dynamic selection of an aeronautical data provider. In one embodiment, the method 600 begins and receives 602 streams of aeronautical data from a plurality of aeronautical data providers streaming aeronautical data from different geographic locations.

In one embodiment, the method 600 determines 604 a quality of each of the received streams of aeronautical data by checking the aeronautical data against data provided by at least one secondary data source that has a known quality.

In one embodiment, the method 600 selects 606 an aeronautical data provider of the plurality of aeronautical data providers that provides a stream of aeronautical data that is closest to the data provided by the at least one secondary data source.

In one embodiment, the method 600 exposes 608 aeronautical data from the stream of aeronautical data of the selected aeronautical data provider to an end user according to one or more parameters, and the method 600 ends. In one embodiment, the stream receiving module 302, the quality determination module 304, the source selection module 306, and the output module 308 perform the different steps of the method 600.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
      receive, during a flight of an aircraft, a first stream of aeronautical data from a first aeronautical data provider of a plurality of aeronautical data providers while the aircraft is within a first streaming area of the first aeronautical data provider, the plurality of aeronautical data providers streaming aeronautical data from different geographic locations and the first stream of aeronautical data comprising at least one of: air traffic surveillance data, historical and/or predicted timing of an action by the aircraft, airspace data for the first streaming area, route availability for the aircraft within the first streaming area, or any combination thereof;
      expose aeronautical data from the first stream of aeronautical data to an end user on an electronic display;
      detecting, during the flight and while the aircraft is within the first streaming area, a second stream of aeronautical data from a second aeronautical data provider of the plurality of aeronautical data providers;
      performing, in response to the detecting, an authentication procedure with the second aeronautical data provider over a data network;
      receive, in response to the authentication procedure, the second stream of aeronautical data from the second aeronautical data provider of the plurality of aeronautical data providers while the aircraft is within an overlapping streaming area of the first streaming area and a second streaming area of the second aeronautical data provider;

determine, in response to the receiving, a quality of each of the first stream and the second stream of aeronautical data by checking the aeronautical data against data provided by at least one secondary data source that has a known quality;

select, in response to determining the quality of each of the first stream and the second stream of aeronautical data, one of the first aeronautical data provider and the second aeronautical data provider of the plurality of aeronautical data providers that provides a stream of aeronautical data having the highest quality; and during the flight of the aircraft and in response to selecting the second aeronautical data provider, switch the electronic display to expose aeronautical data from the second stream of aeronautical data to the end user-according to one or more parameters.

2. The apparatus of claim 1, wherein the code is executable by the processor to normalize data of each of the first stream and the second stream of aeronautical data from the plurality of aeronautical data providers.

3. The apparatus of claim 2, wherein the code is executable by the processor to group the aeronautical data that are normalized from each of the streams of aeronautical data by data attributes.

4. The apparatus of claim 3, wherein the data attributes are selected from the group comprising latitude, longitude, heading, altitude, speed, time of day, date, and geographic location.

5. The apparatus of claim 1, wherein the quality of each of the first stream and second stream of aeronautical data is determined by calculating a proximity of data points of each of the first and second streams of aeronautical data to corresponding data points of the at least one secondary data source.

6. The apparatus of claim 1, wherein the at least one secondary data source is selected from a plurality of secondary data sources according to the known quality of each of the plurality of secondary data sources.

7. The apparatus of claim 1, wherein the code is executable by the processor to train a machine learning model along the one or more parameters using the stream of aeronautical data from the selected aeronautical data provider, the machine learning model used to predict which of the plurality of aeronautical data providers to select based on the one or more parameters along a boundary where the streams of aeronautical data overlap.

8. The apparatus of claim 1, wherein the one or more parameters is selected from the group comprising a latitude, a longitude, a heading, an altitude, a speed, a time of day, a date, and a geographic location.

9. The apparatus of claim 1, wherein the code is executable by the processor to determine a quality of the first stream and second stream of aeronautical data on a per-attribute basis and expose the aeronautical data on the per-attribute basis from multiple streams of the plurality of aeronautical data providers according to the determined quality.

10. The apparatus of claim 1, wherein the plurality of aeronautical data providers comprises data repositories that provide streams of aeronautical data for a plurality of flights, the received streams comprising streams of overlapping aeronautical data from different data repositories.

11. A method, comprising:
receiving, during a flight of an aircraft, a first stream of aeronautical data from a first aeronautical data provider of a plurality of aeronautical data providers while the aircraft is within a first streaming area of the first aeronautical data provider, the plurality of aeronautical data providers streaming aeronautical data from different geographic locations and the first stream of aeronautical data comprising at least one of: air traffic surveillance data, historical and/or predicted timing of an action by an aircraft, airspace data for the first streaming area, route availability for the aircraft within the first streaming area, or any combination thereof;

exposing aeronautical data from the first stream of aeronautical data to an end user on an electronic display;

detect, during the flight and while the aircraft is within the first streaming area, a second stream of aeronautical data from a second aeronautical data provider of the plurality of aeronautical data providers;

perform, in response to the detecting, an authentication procedure with the second aeronautical data provider over a data network;

receiving, in response to the authentication, the second stream of aeronautical data from the second aeronautical data provider of the plurality of aeronautical data providers while the aircraft is within an overlapping streaming area of the first streaming area and a second streaming area of the second aeronautical data provider;

determining, in response to the receiving, a quality of each of the first stream and the second stream by checking the aeronautical data against data provided by at least one secondary data source that has a known quality;

selecting, in response to determining the quality of each of the first stream and the second stream of aeronautical data, one of the first aeronautical data provider and the second aeronautical data provider of the plurality of aeronautical data providers that provides a stream of aeronautical data having the highest quality; and during the flight of the aircraft and in response to selecting the second aeronautical data provider, switching the electronic display to expose aeronautical data from the second stream to the end user according to one or more parameters.

12. The method of claim 11, further comprising normalizing data of each of the first stream and second stream of aeronautical data from the plurality of aeronautical data providers and grouping the aeronautical data that are normalized from each of the first stream and second stream of aeronautical data by data attributes.

13. The method of claim 12, wherein the data attributes are selected from the group comprising latitude, longitude, heading, altitude, speed, time of day, date, and geographic location.

14. The method of claim 11, wherein the quality of each of the first stream and second stream of aeronautical data is determined by calculating a proximity of data points of each of the first stream and second stream of aeronautical data to corresponding data points of the at least one secondary data source.

15. The method of claim 11, wherein the at least one secondary data source is selected from a plurality of secondary data sources according to the known quality of each of the plurality of secondary data sources.

16. The method of claim 11, further comprising training a machine learning model along the one or more parameters using the stream of aeronautical data from the selected aeronautical data provider, the machine learning model used to predict which of the plurality of aeronautical data providers to select based on the one or more parameters.

17. The method of claim 11, wherein the one or more parameters is selected from the group comprising a latitude, a longitude, a heading, an altitude, a speed, a time of day, a date, and a geographic location.

18. The method of claim 11, further comprising determining a quality of the first stream and second stream of aeronautical data on a per-attribute basis and expose the aeronautical data on the per-attribute basis from multiple streams of the plurality of aeronautical data providers according to the determined quality.

19. The method of claim 11, wherein the plurality of aeronautical data providers comprises data repositories that provide streams of aeronautical data for a plurality of flights, the received streams comprising streams of overlapping aeronautical data from different data repositories.

20. An apparatus, comprising:
a processor; and
a memory that stores code executable by the processor to:
receive, during a flight of an aircraft, a first stream of aeronautical data from a first aeronautical data provider of a plurality of aeronautical data providers while the aircraft is within a first streaming area of the first aeronautical data provider, the plurality of aeronautical data providers streaming aeronautical data from different geographic locations and the first stream of aeronautical data comprising air traffic surveillance data, historical and/or predicted timing of an action by the aircraft, airspace data for the first streaming area, route availability for the aircraft within the first streaming area, or any combination thereof;
expose aeronautical data from the first stream of aeronautical data to an end user on an electronic display;
detecting, during the flight and while the aircraft is within the first streaming area, a second stream of aeronautical data from a second aeronautical data provider of the plurality of aeronautical data providers;
receive, in response to the detecting, the second stream of aeronautical data from the second aeronautical data provider of the plurality of aeronautical data providers while the aircraft is within an overlapping streaming area of the first streaming area and a second streaming area of the second aeronautical data provider;
determine, in response to the detecting, a quality of each of the first stream and the second stream of aeronautical data by checking air traffic surveillance data, historical and/or predicted timing of an action by the aircraft, airspace data for the first streaming area, route availability for the aircraft within the first streaming area, or any combination thereof of the aeronautical data against radar data provided by at least one secondary data source that has a known quality;
select, in response to determining the quality of each of the first stream and the second stream of aeronautical data, one of the first aeronautical data provider and the second aeronautical data provider of the plurality of aeronautical data providers that provides a stream of aeronautical data having the highest quality; and
during the flight of the aircraft and in response to selecting the second aeronautical data provider, switch the electronic display to expose aeronautical data from the second stream of aeronautical data to the end user-according to one or more parameters.

* * * * *